A. H. DE VOE.
SEWING MACHINE.
APPLICATION FILED MAY 18, 1916.
1,369,405.
Patented Feb. 22, 1921.
4 SHEETS—SHEET 1.
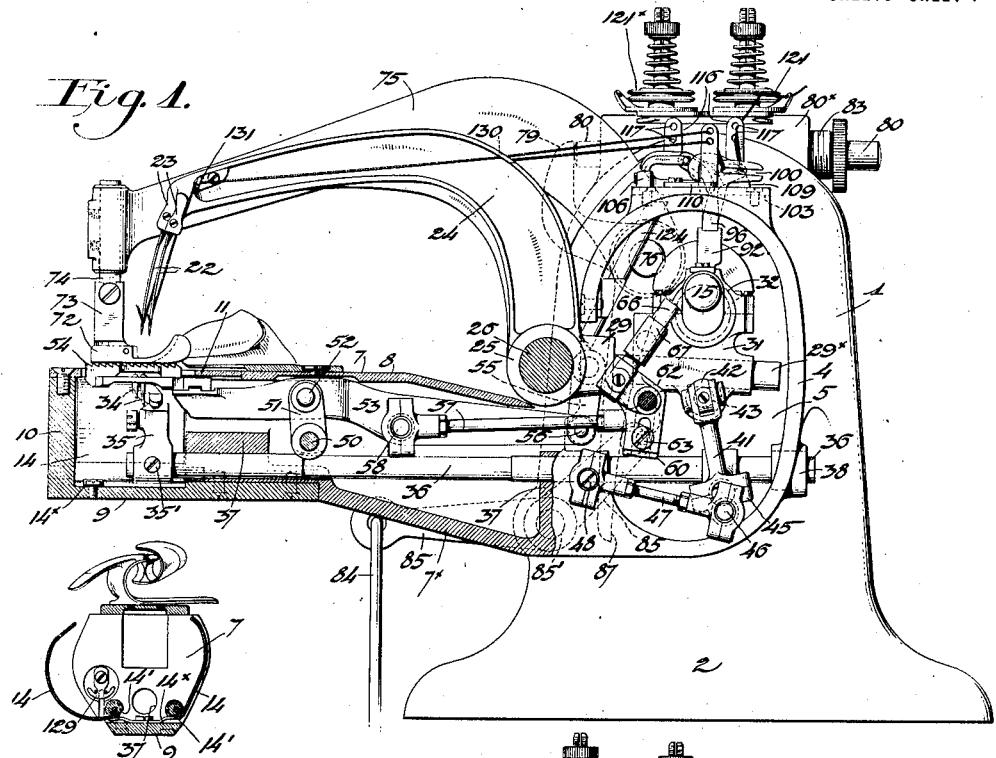
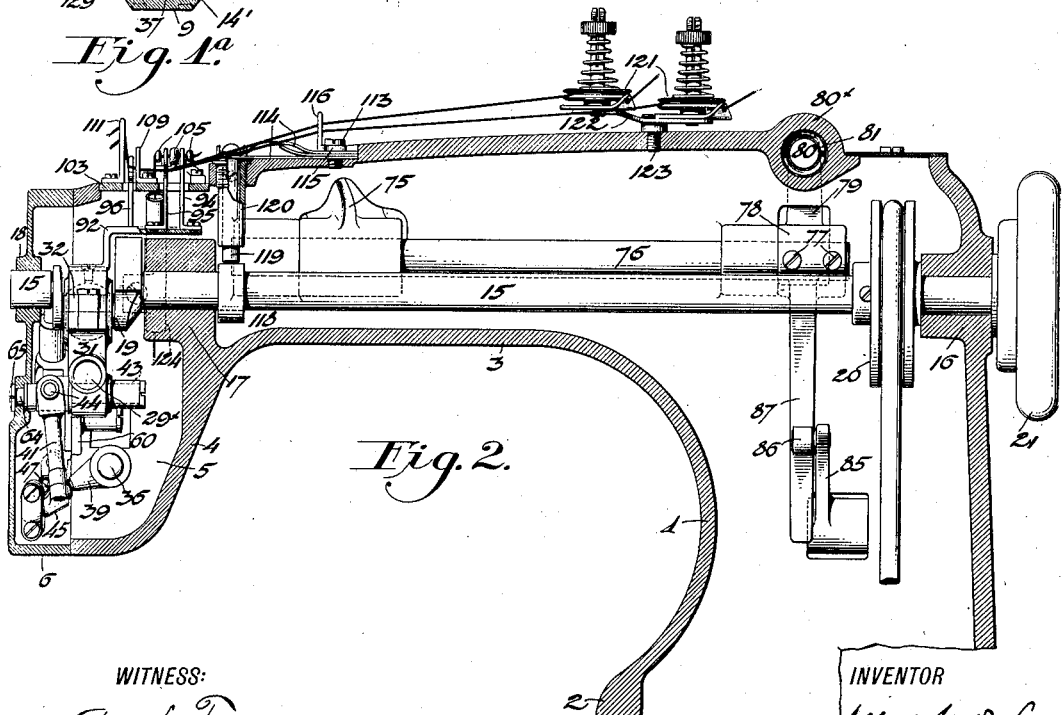
WITNESS:
INVENTOR
Albert H. DeVoe
BY
Henry J. Miller
ATTORNEY

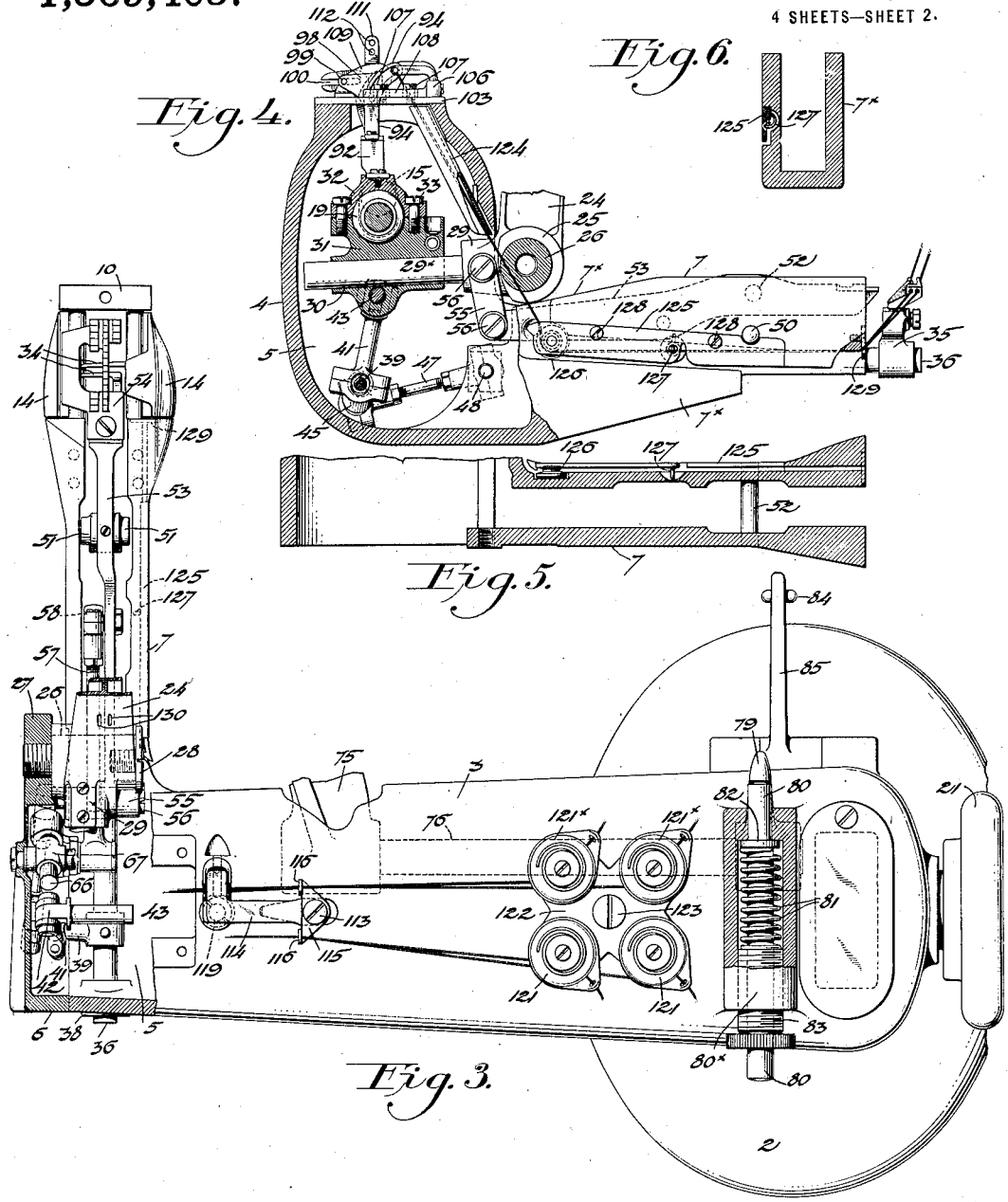

A. H. DE VOE.
SEWING MACHINE.
APPLICATION FILED MAY 18, 1916.
1,369,405.
Patented Feb. 22, 1921.
4 SHEETS—SHEET 3.
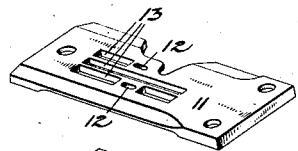
*Fig. 7.*
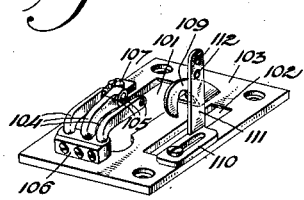
*Fig. 9.*
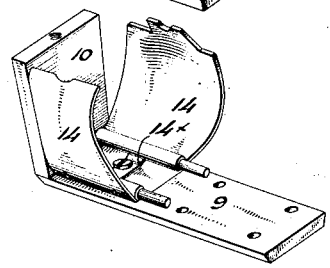
*Fig. 8.*
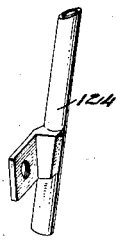
*Fig. 10.*
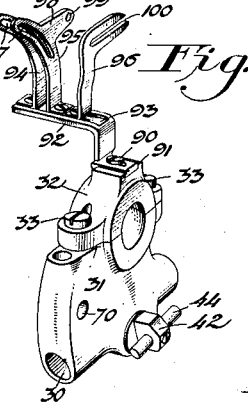
*Fig. 12.*
*Fig. 11.*
*Fig. 13.*
*Fig. 14.*
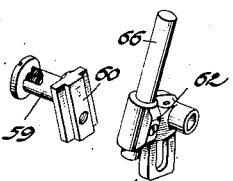
*Fig. 15.*
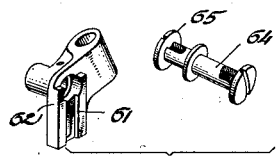
*Fig. 16.*
WITNESS:
Géza L. Ferna
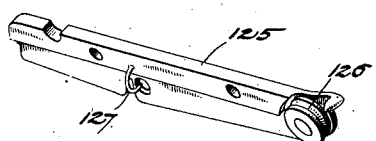
*Fig. 17.*
INVENTOR
Albert H. DeVoe
BY
Henry J. Miller
ATTORNEY A. H. DE VOE.
SEWING MACHINE.
APPLICATION FILED MAY 18, 1916.
1,369,405.
Patented Feb. 22, 1921.
4 SHEETS—SHEET 4
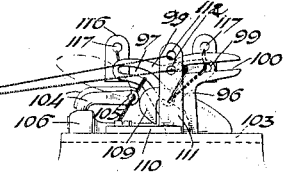
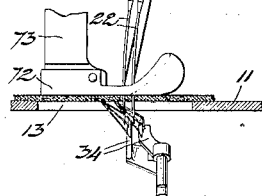
*Fig. 18.*
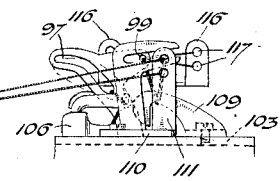
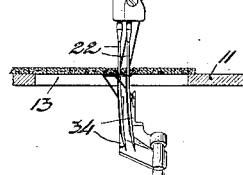
*Fig. 19.*
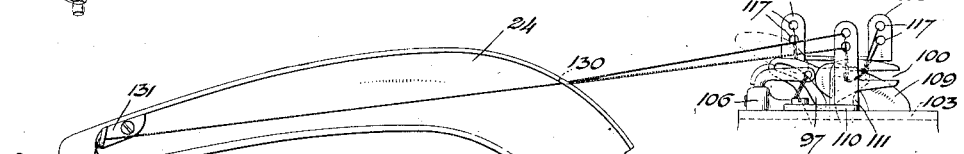
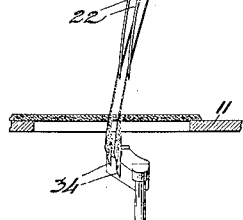
*Fig. 20.*
WITNESS:
INVENTOR
Albert H. DeVoe
BY
Henry J. Miller
ATTORNEY

UNITED STATES PATENT OFFICE.

ALBERT H. DE VOE, OF WESTFIELD, NEW JERSEY, ASSIGNOR TO THE SINGER MANUFACTURING COMPANY, A CORPORATION OF NEW JERSEY.

SEWING-MACHINE.

1,369,405. Specification of Letters Patent. Patented Feb. 22, 1921.

Application filed May 18, 1916. Serial No. 98,277.

*To all whom it may concern:*

Be it known that I, ALBERT H. DE VOE, a citizen of the United States, residing at Westfield, in the county of Union and State of New Jersey, have invented certain new and useful Improvements in Sewing-Machines, of which the following is a specification, reference being had therein to the accompanying drawings.

This invention relates to sewing machines and more particularly to feed-off-the-arm machines for sewing up tubular work in such a manner that the body of the work may pass freely beneath and longitudinally of the work-arm, toward the free end thereof, while the seam is stitched upon the upper surface of the work-arm.

In my copending applications Serial No. 852,345, filed July 22, 1914 and Serial No. 873,872, filed November 25, 1914, patented January 1, 1918, Nos. 1,251,872 and 1,251,873, respectively, I have disclosed lockstitch machines of the type above referred to, which have a form of frame designed to permit the free handling of continuous lengths of work, and the primary object of the present invention is the construction and arrangement of chain-stitch mechanism appropriate to the general form of frame disclosed in said copending applications. It is to be understood, however, that the invention in certain aspects is not necessarily limited to a chain-stitch machine.

According to the present improvement, in its preferred embodiment, the frame is constructed with a hollow standard from the upper end of which extends a lateral bridge-member having at its free end an enlargement afforded by a downwardly extending portion which merges into the upper side of the upwardly inclined end-portion of a lateral work-arm, the free end-portion of which is substantially horizontal. The work-arm, including the inclined and horizontal portions is disposed transversely to both the standard, from which it is laterally offset, and the bridge-member.

The main-shaft, journaled within and extending lengthwise of the bridge-member, is provided at one end with a pulley driven by a belt extending downwardly within the hollow standard to a suitable source of power. At its opposite end the main-shaft carries a crank or its equivalent embraced by a follower disposed within the enlargement at the free end of the bridge-member. The driving connections between the mainshaft and the needle, feed-dog, looper, needle-thread take-up, and looper-thread takeup are all made through this crank-follower. In other words, the crank-follower imparts properly timed operative movements to several of the coöperating mechanisms which are active during the sewing operation.

In the accompanying drawings, Figure 1 is a side elevation of the machine showing the work-arm partly in section; Fig. 1ª is a cross-section through the free end-portion of the work-arm. Fig. 2 is a vertical section through the bridge-member and standard showing the working parts housed within the same. Fig. 3 is a plan view, partly in section. Fig. 4 is a reverse side elevation of the work-arm showing the bridge-member in section. Fig. 5 is a horizontal section through the work-arm. Fig. 6 is a vertical cross-section through the work-arm. Fig. 7 is a perspective of the throat-plate. Fig. 8 is a perspective of the extension-piece and cover-plates at the free end of the work-arm. Fig. 9 is a perspective of the stationary thread-guides which coöperate with the take-ups. Fig. 10 shows the looper-thread tube. Fig. 11 is a detail of the feeding-mechanism. Fig. 12 is a perspective of the crank-follower showing the take-up arms carried thereby. Figs. 13 and 14 are details of the looper-mechanism. Figs. 15 and 16 illustrate details of the feeding-mechanism. Fig. 17 is a perspective of the looper-thread guiding plate. Figs. 18, 19 and 20 illustrate successive positions assumed by the thread-controlling mechanism during a cycle of operations.

In the preferred embodiment of the invention, as illustrated, the frame comprises the hollow upright standard 1 having the flanged base 2 and sustaining at its upper end the lateral, hollow intermediate or bridge-member 3 the free end of which is extended downwardly at 4 affording an enlarged cavity 5 closed on one side by a removable cap-plate 6. Extending in a direction transversely to both the upright standard and the bridge-member and merging into the lower end-portion of the downward extension 4 is the upwardly inclined portion 7× of the work-arm 7 the free end portion of which is substantially horizontal. The inclined portion 7× is in the form of a hollow trough, as shown in Fig. 6, and the upper side is normally closed by a removable cover-plate 8, Fig. 1. Secured to the lower wall of the free end-portion of the trough-like member is a substantially horizontal extension-piece 9 at the free end of which rises the end-wall 10. The throat-plate 11, having the usual needle aperture or apertures, such as 12 and feed-dog apertures 13, is secured by suitable screws to the end wall 10 and to the main trough-like body of the work-arm 7 and forms a continuation of the cover-plate 8. Hinged cover-plates 14, adapted to swing outwardly and downwardly, are provided to give access to the loopers 34 which are housed within the free end-portion of the work-arm 7, as shown in Figs. 1 and 1ª, and a leaf-spring 14× secured between its ends to the extension piece 9 is provided to press upwardly against the flattened surfaces 14' to yieldingly hold the cover-plates 14 in closed position. By inclining portion 7× of the work-arm 7 as illustrated, it is made to conform to the lead of the material being drawn up to the work-arm and manipulated into a tube in advance of the stitch-forming mechanism.

The main-shaft 15 extends within and longitudinally of the bridge-member 3 and is journaled in the three alined bearings 16, 17 and 18 provided therefor in the upright standard 1, the bridge-member 3 and the cap-plate 6, respectively. Formed in the main-shaft 15, within the cavity 5 and intermediate the bearings 17 and 18 is the spherical surfaced crank 19 from which various operative parts of the machine derive their properly timed movements, as hereinafter more fully described. The main-shaft is adapted to be driven through belt connections with a pulley 20 mounted thereon within the standard 1 and may be turned over by the externally mounted hand-wheel 21, disposed within convenient reach of the operator.

The needles 22 are secured within suitably apertured bosses 23 carried at the free end of a curved needle-lever 24 whose hub 25 is journaled upon a transverse stud-pin 26 screwed into a threaded aperture in an extension 27 of the cap-plate 6. The cap-screw 28, threaded into the free end of the stud-pin 26, holds the hub of the needle-lever in position thereon. Projecting laterally from the hub of the needle-lever is a boss 29 in which is suitably secured a pin 29× which is received in a corresponding socket 30 in the crank-follower 31 embracing the crank 19, on the main-shaft 15. The crank-follower 31 is made in two sections and includes the strap 32 which is secured to the body-portion by the screws 33, as best shown in Fig. 12. Rotation of the main-shaft will raise and lower the crank-follower 31, which in turn will slide upon and vibrate the pin 29× of needle-lever 24 thus imparting reciprocatory movements to the needlss 22.

To coöperate with the needles 22 in the formation of stitches I provide suitable loop-taking mechanism. This mechanism is preferably of the chain-stitch type and, in the present instance, comprises the thread-carrying loopers 34, adjustably mounted in suitable sockets in the looper-support 35 adjustably fixed by a screw 35' upon one end of the looper-shaft 36 journaled to rock and slide in bearings 37, 37, formed in the work-arm 7, and a bearing 38 formed in the extension 4 of the bridge-member. The looper-shaft is actuated through the crank-arm 39 having a ball-end embraced by a spherical socket 40 intermediate the ends of a lever 41 the upper end of which is forked to embrace a head 42 of a pin 43 journaled, in parallelism with the main-shaft, within a suitable aperture in the crank-follower 31 below the socket 30. A transverse pin 44 serves to pivotally connect the forked end of the lever 41 with the head 42 thus permitting universal motion of the lever relative to the crank-follower 31. The lever 41 includes a strap member 45 in which is formed the lower half of the spherical socket 40 and which carries a laterally extended ball-stud 46 embraced by the strapped end of an adjustable link 47, whose opposite strapped end embraces a ball-member 48 fixed to the work-arm 7. The link 47 extends in the same general direction as the looper-shaft 36 and serves to anchor the lower end of the lever 41 to the work-arm 7. The pin 43 sustained by the crank-follower 31 will be moved in a substantially elliptical path and the lever 41 will therefore move the loopers in a substantially elliptical path which may be varied by adjusting the carrier 35 and link 47. It will be noted that there are but three working joints between the lever 41 and the looper-shaft and frame, exclusive of the means for moving the upper end of the lever 41 which means may of course be modified.

The feeding-mechanism is housed within the hollow work-arm and comprises a transversely extending fixed pin 50 upon which are journaled the lower ends of a pair of spaced links 51, 51, whose upper ends support a transverse pivot-pin 52 rigidly secured to and intermediate the ends of a feed rock-lever 53 one extremity of which carries the feed-dog 54. To impart rising-and-falling movements to the feed-dog 54, the opposite extremity of the rock-lever 53 is connected by a link 55, Fig. 4, and screw-pins 56, 56 to the flattened side face of the boss 29 on the needle rock-lever 24 which is actuated through the pin 29ˣ and crank-follower 31 as previously described.

To impart feed-and-return movements to the feed-dog an adjustable link 57, extending in a direction lengthwise of the work-arm, is connected at one end to a ball-stud 58 upon the rock-lever 53 and at its opposite end to a pin 59 rigidly mounted upon a block 60 adjustably secured in a slot 61 in one arm of a lever 62 by a screw 63. The lever 62 is pivoted on a shouldered pin 64 one end of which is rigidly held in place within an aperture in the cap-plate 6 by a screw 65. Rocking movements are imparted to the lever 62 through a pin 66 rigidly secured within an aperture in another arm of said lever 62 and embraced by the sleeved head 67 of a pivot-pin 68 secured within the aperture 70 in the crank-follower 31 by a screw 71.

The presser-foot 72 is pivoted as usual to the slotted shank 73 secured to the presser-bar 74 adjustably mounted in the apertured end of a presser-lever 75 fixed to a shaft 76 suitably journaled within the bridge-member 3, as shown in Fig. 2. Adjustably secured to the shaft 76 by screws 77 is the hub 78 of a lever, one arm 79 of which extends outwardly through an aperture in the frame and upwardly to receive the end-thrust of a horizontal slide-pin 80 journaled in a boss 80ˣ at the top of the standard 1 and surrounded by a spring 81 disposed within said boss. The spring 81 reacts against the shoulder 82 on pin 81 and against the end of the presser adjusting screw 83 threaded into said boss and having an axially disposed aperture to guide the pin 80. The presser-foot may be lifted against the pressure of the spring 81 by means of a treadle-rod 84 suspended from one end of a lever 85 pivoted on the standard 1 at 85′. The opposite end of the lever 85 carries a roller 86 positioned to bear against the lever-arm 87 which extends downwardly from the hub 78 above described.

The thread controlling mechanism for the needle- and looper-threads comprises movable take-up arms and stationary thread-guides with which the movable take-up arms coöperate. Adjustably secured in a seat at the top of the crank-follower 31 by a screw 90 is the offset shank 91 of a laterally extending supporting bar 92, the upper side of which is recessed longitudinally at 93 to receive the bent shanks of the take-up arms 94, 95 and 96 which are held fixedly in position on the bar 92 by suitable screws. The take-up arms 94 and 95 are provided with similar elongated slots 97, 97, adapted to control the looper-thread or threads and the arm 95 is provided with a lateral extension 98 having a thread-eye 99 which assists in controlling the needle-thread or threads. The upper end of the take-up arm 96 is extended in the same direction as the extension 98 and is provided with a substantially horizontal open-ended slot 100.

The take-up arms 94, 95 and 96 project upwardly through slots 101, 102 in a plate 103 seated on the upper side of the free end-portion of the bridge-member 3, and coöperate with stationary thread-guides carried by said plate. The path of the upper end of the looper-thread take-up slots 97 is shown by a dot-and-dash line in Figs. 18, 19 and 20, and it will be obvious that the other movable take-up elements move along similar paths. For the looper-threads, I provide three stationary thread-guides 104 having overhanging free ends formed with alined thread-eyes 105 disposed above the slot 101 and in alternate relation with the slots 97 in the take-up arms 94 and 95. The thread-guides 104 are held by screws in suitable apertures in a block 106 adjustably secured to the upper surface of the plate 103 at the end of the slot 101 by screws 107 which pass through elongated apertures in an extension 108 of said block, as shown in Fig. 4.

Adjustably mounted on the plate 103 at one side of the slot 102 is an overhanging hook-shaped thread-guide 109. Adjustably secured to the plate 103, at the other side of the slot 102 is the slotted base 110 of an upstanding post 111 having needle-thread guiding apertures 112. The needle-thread take-up arm 96 is thus adapted to move between the fixed thread guides 111 and 109.

Fixedly secured on top of the bridge-member 3, by a screw 113, are the shanks of two superposed looper-thread nipper-springs 114 and also a transversely extending plate 115 having at its opposite ends upwardly extending projections 116, each of which is provided with a plurality of thread-eyes 117 for the needle- and looper-threads. A cam 118 on the main-shaft 15 is provided to transmit endwise movement to a slide-pin 119 fitted in a vertical tubular guide 120 screwed into an aperture in the upper wall of the bridge-member 3 under the free ends of the nipper-springs 114. The nipper-springs normally assume separated positions and the pin 119 in its upward movement will lift the lower spring, thus nipping the looper-thread against the upper spring.

Suitable thread-tensions 121, 121ˣ are carried by a plate 122 fixed upon the bridge-member 3 by a centrally disposed screw 123. These tensions are adapted to act upon the thread leading from the supply to the thread-controlling mechanism and may be adjusted as desired, although it is usually preferred to place a light tension on the looper-threads and a heavier tension on the needle-threads.

A looper-thread tube 124 is mounted within the enlarged cavity 5 and leads the thread from the last stationary thread-guide 104 to a point adjacent the cap-screw 28. A thread-guiding plate 125, having a thread-wheel 126 at one end and a thread-guiding hook 127 mounted centrally thereof, is let into a recess in one side wall of the work-arm 7, as shown in Fig. 6, and secured in position by screws 128. A stationary thread-guide 129 is secured in the end wall of the work-arm 7 adjacent the heels of the loopers, as shown in Fig. 4.

The needle-threads lead from the tensions 121 to the stationary guides 116, thence to the thread-eye 99 in the take-up arm 95, thence under the stationary guide-hook 109 and through the open ended slot in the take-up arm 96, thence through the stationary thread-eyes 112, thence through eyes 130 in the needle-lever and through the thread-guides 131 secured to the free end of the needle-lever and lastly through the eyes of the needles.

The looper-threads extend from the tensions 121$^x$, through certain of the stationary guides 116, thence between the free end-portions of the nipper-springs 114, thence through the stationary guide-eyes 105 and the take-up slots 97 in alternation, thence through the thread-tube 124 and under the guide-wheel 126, thence over the hook 127 out through the stationary guide 129 and lastly into the eyes of the loopers.

In the operation of the machine, starting from the position shown in Fig. 1 with the needles at their highest point and the loopers fully advanced, as the needles descend the rising needle-thread take-ups 99 and 100 absorb the slack-thread caused by the descending thread-guide 131 at the end of the needle-lever, and prevent the formation of slack-thread between the needle-eyes and the work. The rising looper-thread take-up elements 97 absorb the slack caused by the retracting loopers and prevent the formation of slack between the looper-eyes and the last stitch, the looper-thread nippers being closed at this time. When the needle-eyes reach the fabric the parts are in the position shown in Fig. 18 and the needle points are entering the well-known triangular spaces bounded by the looper-threads, the needle-loops and the looper-blades.

From this position, the thread required by the descending needle-eyes is first supplied by the movement of the take-up arms to the left in Fig. 18 until the closed end of the slot 100 reaches the thread-eyes 112. At this time the needle-loops are shed from the looper-blades and further descent of the needle-eyes serves to take up and set the previous needle-loops. At the same time the looper-thread take-up slots 97 provide slack-thread for the retracting loopers in order that the needle-loops, which embrace the looper-loops now caught by the needles, may be fully drawn up to the under surface of the work, as shown in Fig. 19.

As the needles start to rise from their lowest position, as shown in Fig. 19, the descending take-up arms give up thread required by the rising guide 131 and insure the formation of slack needle-loops to be entered by the advancing loopers. The take-ups also provide slack thread for the advancing loopers. The thread-nipper is opened during the first portion of the loop-seizing movement of the loopers and when the parts reach the position shown in Fig. 20 the advancing looper-eyes draw the thread they require from the supply through the tensions 121$^x$ which are lightly adjusted. The looper-threads now extend straight through the apertures 105 and slots 97. The rising needle-bar and needle-thread take-ups also act to pull needle-thread from the supply during the movement of the parts from the position shown in Fig. 20, to that shown in Fig. 1 at which time the work-feeding operation occurs.

The invention is not to be understood as being limited to the details of construction, herein shown and described, by which it is carried into effect as the form and structure may obviously be widely varied within the scope of the invention.

Having thus set forth the nature of the invention, what I claim herein is:—

1. A chain-stitch sewing machine comprising a frame formed with a standard, an intermediate member carried by said standard and extending laterally above the base of the latter, a hollow work-supporting arm carried by said intermediate member and extending transversely of said standard and intermediate member, a needle-lever overhanging the work-supporting arm, a needle fixed to said needle-lever, a chain-stitch looper within said work-supporting arm for coöperation with said needle, a rock shaft carrying said looper extending longitudinally within said arm and into said intermediate member, actuating means extending through the latter and connected to said rock shaft, and feeding mechanism incorporated in said frame and operating to feed the work off the free end of said work-supporting arm.

2. A chain-stitch sewing machine comprising a frame formed with a standard, an intermediate member carried by said standard and extending laterally above the base of the latter, a hollow work-supporting arm carried by said intermediate member and extending transversely of said standard and intermediate member, a needle-lever overhanging the work-supporting arm, a needle fixed to said needle-lever, a looper mounted within the work-supporting arm for loop-seizing and sidewise movements and having a rock shaft extending through said arm into said intermediate member, feeding mechanism including a four-motion feed-dog for feeding the work off the free end of said work-supporting arm, a main-shaft extending through said intermediate member, and operating connections between said main-shaft and said needle-lever, looper and feeding mechanism.

3. In a sewing machine, in combination, an oscillating needle-lever, a needle carried thereby, a looper, looper supporting mechanism adapted to impart loop-seizing and sidewise movements to the looper, a feed-dog, needle and looper-thread take-up means, a main actuating crank, a crank-follower and a plurality of operative connections deriving motion from said crank-follower for directly actuating said needle lever, looper supporting mechanism, feed-dog and take-up means.

4. In a chain-stitch sewing machine, in combination, a frame comprising a standard, an overhanging bridge-member, a substantially horizontal work-supporting arm carried at the free end of said bridge-member, a main-shaft journaled lengthwise of said bridge-member, and needle, looper, feeding and take-up mechanisms carried by said frame and actuated by said shaft.

5. In a sewing machine, in combination, a frame comprising a main supporting standard, an overhanging hollow bridge-member supported at one end by said standard and having at its free end an enlarged cavity, a lateral work-arm connected to the free end of said bridge-member, a main-shaft journaled in said bridge-member and extending into said cavity, and stitch-forming, feeding and take-up mechanisms including, in common, an actuated element housed within said cavity, and actuating connections between said main-shaft and said actuated element.

6. In a sewing machine, in combination, a main-shaft, a crank on said main-shaft, a reciprocating needle, a thread-carrying looper mounted for loop-seizing and sidewise movements, four-motion feeding mechanism, a needle-thread take-up, a looper-thread take-up, a crank-follower embracing said crank and separate operative connections between said crank-follower and said needle, looper, feeding mechanism and take-ups respectively for giving operative movements thereto.

7. In a sewing machine, in combination, a frame, a main-shaft journaled therein, stitch-forming mechanism comprising an oscillating needle lever, a needle carried thereby and a thread-carrying looper mounted for loop-taking and sidewise movements, four-motion feeding mechanism, an element movable relatively to and actuated by said main-shaft and connections separately deriving motion from said element for imparting operative movements to said mechanisms.

8. In a sewing machine, in combination, a frame comprising a main supporting portion and a hollow work-supporting arm, free at one end and at its opposite end joining the main supporting portion of the frame, a reciprocating needle, a looper and feed-dog disposed within said work-supporting arm, a main-shaft having a crank-member, a crank-follower embracing said crank-member and separate operative connections from said crank-follower respectively for driving said looper and feed-dog for imparting operative movements thereto.

9. In a sewing machine, in combination, a frame comprising a main supporting portion and a hollow work-supporting arm, free at one end and at its opposite end joining the main supporting portion of the frame, a reciprocating needle, a looper and feed-dog disposed within said work-supporting arm, a main-shaft having a crank-member, a crank-follower embracing said crank-member and separate operative connections from said crank-follower respectively to said needle, looper and feed-dog for imparting operative movements thereto.

10. In a chain-stitch sewing machine, in combination, a main-shaft, looper mechanism including a looper-blade mounted for endwise and sidewise movements, feeding mechanism including a four-motion feed-dog, a single actuating crank common to said mechanisms and mounted on said main-shaft, and a crank-follower embracing said crank and having separate connections to impart each of the movements to the looper-blade and operative movements to the feed-dog.

11. In a chain-stitch sewing machine, in combination, a frame, a main-shaft journaled therein, a needle-lever, a needle carried thereby, a thread-carrying looper mounted for loop-seizing and sidewise movements, an element actuated by said main-shaft, and mutually independent means for actuating said needle-lever and looper from said element including a sliding connection with the needle-lever.

12. In a chain-stitch sewing machine, in combination, a supporting frame, a main-shaft journaled therein, a needle, a needle-carrying rock-lever, a looper, a looper-supporting shaft mounted for sliding and rocking movements, an element actuated by said main-shaft, an operative connection between said actuated element and said rock-lever, and an element independent of said needle-lever and functioning as a combined link and lever for connecting said actuated element to said looper-shaft to impart to said shaft its rocking and sliding movements.

13. In a sewing machine, in combination, a hollow frame comprising a standard, an overhanging bridge-member, and a work-supporting arm free at one end and at its opposite end joining said bridge-member, a main-shaft journaled within and lengthwise of said bridge-member, a needle, a needle carrying rock-lever disposed over said work-supporting arm, a looper, a looper supporting shaft, mounted within and lengthwise of said work-supporting arm for rocking and sliding movements, an element actuated by said main-shaft and disposed within said frame, and connections between said actuated element and said needle-lever and looper-shaft for imparting to these parts said operative movements.

14. In a sewing machine, in combination, a main-shaft, a crank on said shaft, a crank-follower, a needle, a needle-actuating lever having a pin-and-socket connection with said crank-follower, a looper, a looper-actuating shaft, and an operative driving connection between said crank-follower and said looper-actuating shaft.

15. In a sewing machine, in combination, a main-shaft, a crank on said main-shaft, an actuated element embracing said crank and having a socket extending transversely of said main-shaft, a pivoted needle-actuating lever having an arm entering said socket, a looper, a looper-supporting shaft and a bodily movable lever connection between said actuated element and said shaft for imparting to the latter rocking and endwise movements.

16. In a sewing machine, in combination, a frame, a main-shaft, a crank carried thereby, a looper, a looper-supporting shaft journaled in said frame for rocking and sliding movements, a crank-arm secured to said looper-supporting shaft, a lever pivoted between its ends to the free end of said crank-arm, a link connected to one end of said lever and to the frame, and an operative connection between said crank and the opposite end of said lever.

17. In a sewing machine, in combination, a frame, a looper, a looper-actuating shaft mounted in said frame for rocking and endwise movements, a crank-arm on said shaft, a lever, a ball-and-socket connection between said lever and said crank-arm intermediate the ends of said lever, a link directly connecting one end of said lever to said frame and means for moving the other end of said lever in a closed path.

18. In a sewing machine, a frame including a hollow work-arm, a looper, a looper-supporting shaft journaled within and longitudinally of said work-arm, a crank-arm carried by said looper-supporting shaft, a lever pivotally connected between its ends to said crank-arm, a link extending in the same general direction as said work-arm and looper-supporting shaft and freely connected at its opposite ends to the frame and to one end of said lever, respectively, and means for imparting rocking and endwise movements to said lever.

19. In a sewing machine, in combination, a frame comprising a vertically extending supporting portion, and a substantially horizontal work-supporting arm joining said vertically extending portion, a main-shaft, a crank member carried thereby, a looper, a looper-supporting shaft extending lengthwise of said work-supporting arm and journaled therein for rocking and endwise movements, a crank-arm carried by said looper-shaft, a link connection between said crank-member and said crank-arm and means connected to the work-supporting arm for confining a point on said link to move along a fixed path, whereby said link acts also as a lever and imparts rocking and endwise movements to said looper-shaft.

20. In a sewing machine, in combination, a needle-lever, a main-shaft, a reciprocating needle, a thread-carrying looper, actuating connections between said main-shaft and said needle-lever and looper, a take-up element mounted independently of the needle-lever and actuated by said main-shaft, said take-up element being provided with thread-guides for the needle- and looper-threads, and stationary thread-guides coöperating with said take-up element to control both the needle- and looper-threads.

21. In a sewing machine, in combination, a main-shaft, a crank-member carried thereby, a bodily movable follower element embracing said crank-member, a reciprocating needle, a looper, needle- and looper-thread controlling means rigidly connected to said element, and stationary thread-guides with which said means coöperate.

22. In a sewing machine, in combination, a continuously rotating crank, a pivoted needle-lever, a movable thread-guide carried thereby, a bodily movable crank-follower connected to actuate said lever, a needle-thread take-up arm mounted on said crank-follower and stationary thread-guides coöperating with said movable thread-guide and take-up arm to control the needle-thread.

23. In a sewing machine, in combination, a continuously rotating crank, a reciprocating needle, a looper-blade mounted in coöperative relation with the needle for endwise and sidewise movements, a needle-thread take-up, a looper-thread take-up, a bodily movable follower element embracing said crank, an operative connection between said follower element and said needle, a connection from the follower for giving said looper-blade its respective movements, and a separate connection from the follower for operating said take-ups.

24. A combined needle- and looper-thread take-up for chain-stitch sewing machines, comprising in combination a driven member, a plurality of take-up arms rigidly connected thereto, one of said arms being provided with thread apertures for the needle- and looper-threads, another of said arms having a thread aperture for the needle-thread and another of said arms having an aperture for the looper-thread, and stationary thread-guides coöperating with said take-up arms.

25. A sewing machine comprising in combination, a frame including an upright supporting standard, an overhanging bridge-member and a lateral work-arm free at one end and at its opposite end joining said bridge-member, stitch-forming instrumentalities including a reciprocating needle and a coöperating thread-carrying looper operating at the free end of said work-arm, needle- and looper-thread tension devices mounted on top of said bridge-member and needle- and looper-thread take-ups disposed between said tensions and the stitch-forming mechanism.

26. A sewing machine comprising, in combination, a frame having an upright standard, an overhanging bridge-member and an elongated work-arm carried by the bridge-member and extending transversely thereof, stitch-forming mechanism carried by said frame and including a reciprocating needle and a coöperating thread-carrying looper operating at the free end of said work-arm, thread controlling means for the needle- and looper-threads including take-ups and tension devices disposed on top of said bridge-member and an intermittently acting looper-thread nipper mounted on top of said bridge-member and operating on the thread between said take-ups and tension devices.

27. In a sewing machine, a reciprocating needle, a feed-dog, a rock lever therefor having a floating fulcrum, a shaft, a crank on said shaft, a crank-follower, and sliding operating connections between said crank-follower and said needle and rock-lever.

28. In a sewing machine, a reciprocating needle, a four-motion feed-dog, a rock-lever therefor having a floating fulcrum, a main-shaft, a crank thereon, a crank follower, and a plurality of independent sliding connections between said crank-follower and rock-lever for giving the feed-dog its respective motions one of said connections also serving to actuate said needle.

In testimony whereof I have signed my name to this specification.

ALBERT H. DE VOE.